Feb. 1, 1955     H. W. SUMMACH ET AL     2,700,856
SOIL COMPACTING APPARATUS
Filed Aug. 25, 1951

INVENTOR.
HARVEY W. SUMMACH
EMERSON H. SUMMACH
BY
*Williamson & Williamson*
ATTORNEYS

United States Patent Office 2,700,856
Patented Feb. 1, 1955

2,700,856

SOIL COMPACTING APPARATUS

Harvey W. Summach, Saskatoon, Saskatchewan, and Emerson H. Summach, Asquith, Saskatchewan, Canada; said Harvey W. Summach assignor to Emerson H. Summach Application August 25, 1951, Serial No. 243,604

1 Claim. (Cl. 55—152)

This invention relates generally to soil compacting apparatus and more particularly to an agricultural implement for compacting the surface soil.

Conventional soil compacting implements are usually supported on wheels which carry a rigid frame on which the usually inflexible compacting element is mounted. This lack of flexibility materially reduces the efficiency of conventional packers on uneven or rocky ground. The conventional roller or wheel type packer tends to pick up the soil on the surface thereof and frequently hinders the operation of other implements being drawn in conjunction therewith such as seeders and the like. Such a packer would obviously require frequent cleaning and has an undesirable differential action when turning corners.

It is an object of our invention to provide a novel and highly efficient soil compacting mechanism having a resiliently flexible compacting member journalled on a suitable mounting frame adapted to be connected to a vehicle for pulling the same.

It is another object to provide a resiliently flexible compacting spiral member having its ends journalled for rotation on a suitable mounting structure and adapted to rotate on an axis disposed transversely of the line of travel over the ground whereby the spiral member will be rotated by engagement thereof with the ground surface, said spiral supporting the entire weight of the compacting mechanism.

More specifically, it is an object to provide a compacting mechanism in which the ground engaging compacting member is formed from an elongated spirally curved coil of slightly flexible material such as steel having a generally triangular cross-sectional shape and provided with a pair of aligned axial trunnions adapted to be journalled at the respective sides of a supporting frame which is adapted to be connected to a draft vehicle.

It is still a further object to provide a soil compacting mechanism constructed to obviate the necessity of any supporting wheels whatever by providing a resiliently flexible spirally shaped compacting member providing the sole means for supporting the mechanism as well as for compacting the engaged soil, the spiral shape producing by engagement of the ground engaging portions, a leveling action by forming compacted grooves in the ground surface disposed diagonally of the direction of travel to materially reduce erosion due to water run-off.

These and other objects and advantages will more fully appear from the following description made in connection with the accompanying drawings wherein like reference characters refer to the same or similar parts throughout the several views and in which Fig. 1 is a horizontal sectional view taken substantially along the line 1—1 of Fig. 2;

Figure 1:
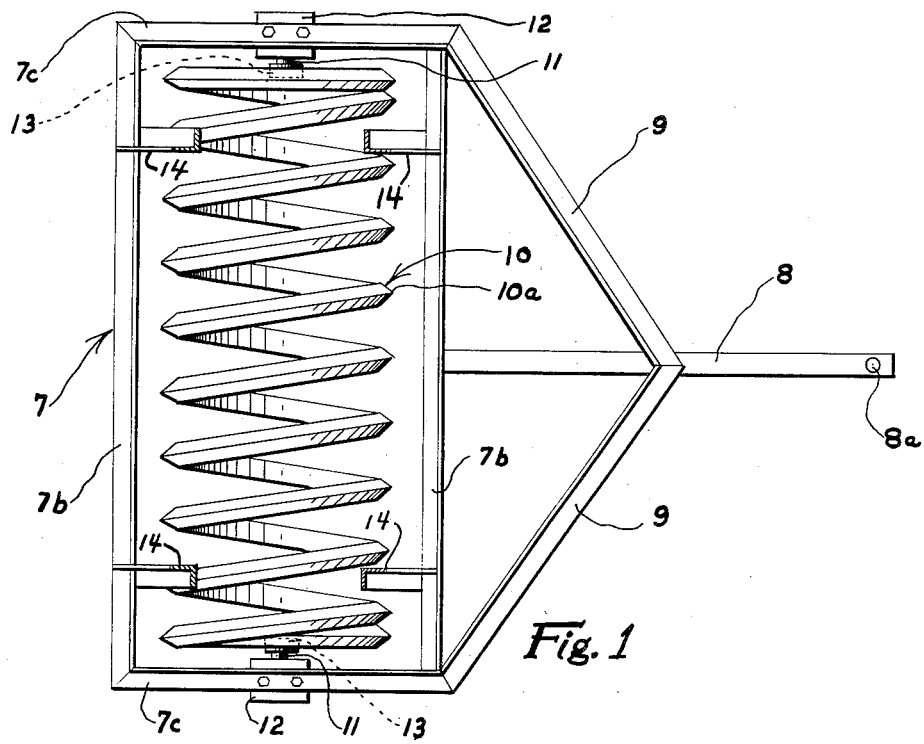

In the embodiment of our invention illustrated, we provide a suitable supporting structure such as the frame 7 which consists in the front and rear cross members 7a and 7b respectively and the two side frame members 7c. A draft tongue member 8 is connected to the medial portion of the forward cross member 7a and extends forwardly therefrom with an aperture 8a through the forward end portion thereof to permit attachment to a draft vehicle such as a farm tractor (not shown). A pair of diagonal bracing members 9 are respectively connected at their rear ends to the forward extremities of the side frame members 7c and extend in converging relation therefrom to an intermediate portion of the tongue member 8 to which the forward ends thereof are securely fixed.

Figure 3:
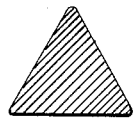
Fig. 3 is an enlarged transverse sectional view of the elongated coil element.

A resiliently flexible compacting member is formed from an elongated piece of slightly flexible material such as steel or the like and in the form shown having a triangular cross-sectional shape, as best shown in Fig. 3. This elongated piece of slightly flexible material is bent into a spiral coil shape having a relatively long pitch although the pitch is of course optional within certain limits. If the pitch is too small, the soil would tend to collect on the inside of the coil and require periodic cleaning and, if the pitch were too great, the broken diagonal grooves produced in the soil surface would be disposed at too great an angle relative to the line of travel of the machine over the ground. The coil is designated as an entirety by the numeral 10 and the ground-engaging ridge thereof designated by the numeral 10a, which obviously produces a generally V-shaped groove in the ground surface. It is, of course, understood that we do not limit ourselves to a triangular cross-section shape, the only requirement being a non-circular cross-section forming a ridge at the outermost circumferential extremity of the coil, which ridge will be continuously produced by the apex of intersecting planes.

Figure 2:
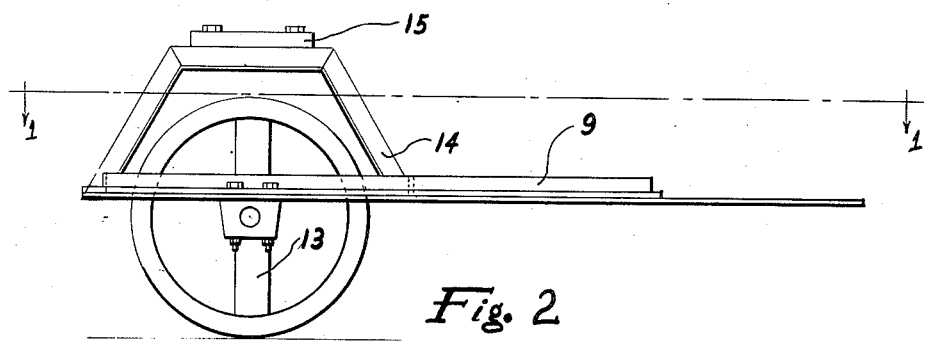
Fig. 2 is a side elevational view of our compacting mechanism.

A pair of axially disposed coil-carrying trunnions 11 are fixed to the respective end portions of the coil 10 and are journalled in suitable bearing blocks 12 fixed to the medial portions of the respective side frame members 7c, as best shown in Fig. 1. The bearing may be of any conventional design to produce efficient rotary action of the coil 10 relative to the frame 7 on an axis disposed transversely to the direction of travel of said frame. In the form shown, the trunnions 11 are anchored to the respective ends of the coil 10 as by a pair of trunnion mounting members 13 respectively fixed across the end portions of the coil 10, as best shown in Figs. 1 and 2.

A weight carrying superstructure may be provided, such as the two upstanding supporting bay frames 14 interconnected by a suitable cross platform member 15 extending therebetween. This cross member 15 also serves to permit attachment of another implement behind our compacting mechanism, such as a seed drill machine or the like. Obviously, the weight of our compacting mechanism may be increased by mounting sand bags or the like on the cross member 15. It should be noted that the general construction of our compacting device is relatively light as compared with the usual compacting machines and this is of material advantage when operating on extremely soft ground where little weight is required.

It will be seen that we have provided a relatively simple and inexpensive compacting machine primarily intended for farm use to compact the surface soil in a field preliminary to the planting operation. Our device produces a series of interrupted diagonally disposed grooves when moved across a field and these grooves, due to the flexibility of the compacting coil 10, will be of substantially uniform depth where the hardness of the ground surface is substantially uniform or, in other words, the compacting pressure exerted by all parts of the compacting coil 10 will be substantially uniform because of the flexibility of said coil 10 even when being operated on an uneven ground surface. When operated on a side hill, our compacting device will maintain a straight line of travel and will not slip sideways as will most conventional packers. The angle and direction of pitch of the coil may be varied to any degree at the time of manufacture so as to permit optimum results in compacting the soil when used in conjunction with a soil tillage implement or other ground conditioning implement. The space between the individual convolutions of the coil may of course be varied at the time of manufacture to permit all loose material to pass freely out between adjacent convolutions while providing highly efficient compaction of the ground surface. Cross harrowing after packing by our improved apparatus is unnecesary since the harrow teeth will cut across the diagonal ridges produced by our compacting coil and produce an extremely uniform and smooth soil surface.

It will, of course, be understood that various changes may be made in the form, details, arrangement and pro-

What we claim is:

Soil compacting apparatus comprising a supporting structure, weight-carrying means on said supporting structure for varying the weight of the apparatus, a spirally coiled resiliently flexible compacting member formed from an elongated piece of slightly flexible metal, said coiled compacting member being journaled on said structure at each end for rotation on an axis disposed transversely of the direction of movement of said structure over the ground surface by engagement of the same with the ground, said journaled ends of said coil constituting the sole supporting connections between said coil and said supporting structure, the convolutions of said compacting coil intermediate said end supporting connections of the same with the supporting structure being all entirely free from auxiliary supporting connection with each other and with the supporting structure to provide for endwise and vertical yielding flexing movement of said intermediate convolutions of the coil relative to each other, said coil being formed of metal bar stock having at least one continuous sharp edge at the intersection of opposed continuous surfaces disposed at the outermost diametrical dimension of said coil, said coil having a degree of resilience permitting the entire coil to yield vertically and follow small variations in the contour of the ground surface and also having a slight degree of endwise resilience for constantly varying the pitch between the convolutions of the coil sufficient to render the coil self-cleaning, and said resilient compacting coil having sufficient stiffness remaining therein to cause said continuous sharp edge to enter the ground in compacting relation therewith for the length of the coil whereby to produce a plurality of diagonally disposed compacted grooves in said ground irrespective of the condition of the ground and in accordance with the amount of weight exerted on said weight-carrying means.

References Cited in the file of this patent

UNITED STATES PATENTS

| Number | Name | Date |
|---|---|---|
| 375,364 | La Dow | Dec. 27, 1887 |
| 433,573 | La Dow | Aug. 5, 1890 |
| 701,512 | Scott | June 3, 1902 |
| 723,896 | Moore | Mar. 31, 1903 |
| 2,503,317 | Bergquist | Apr. 11, 1950 |